UNITED STATES PATENT OFFICE.

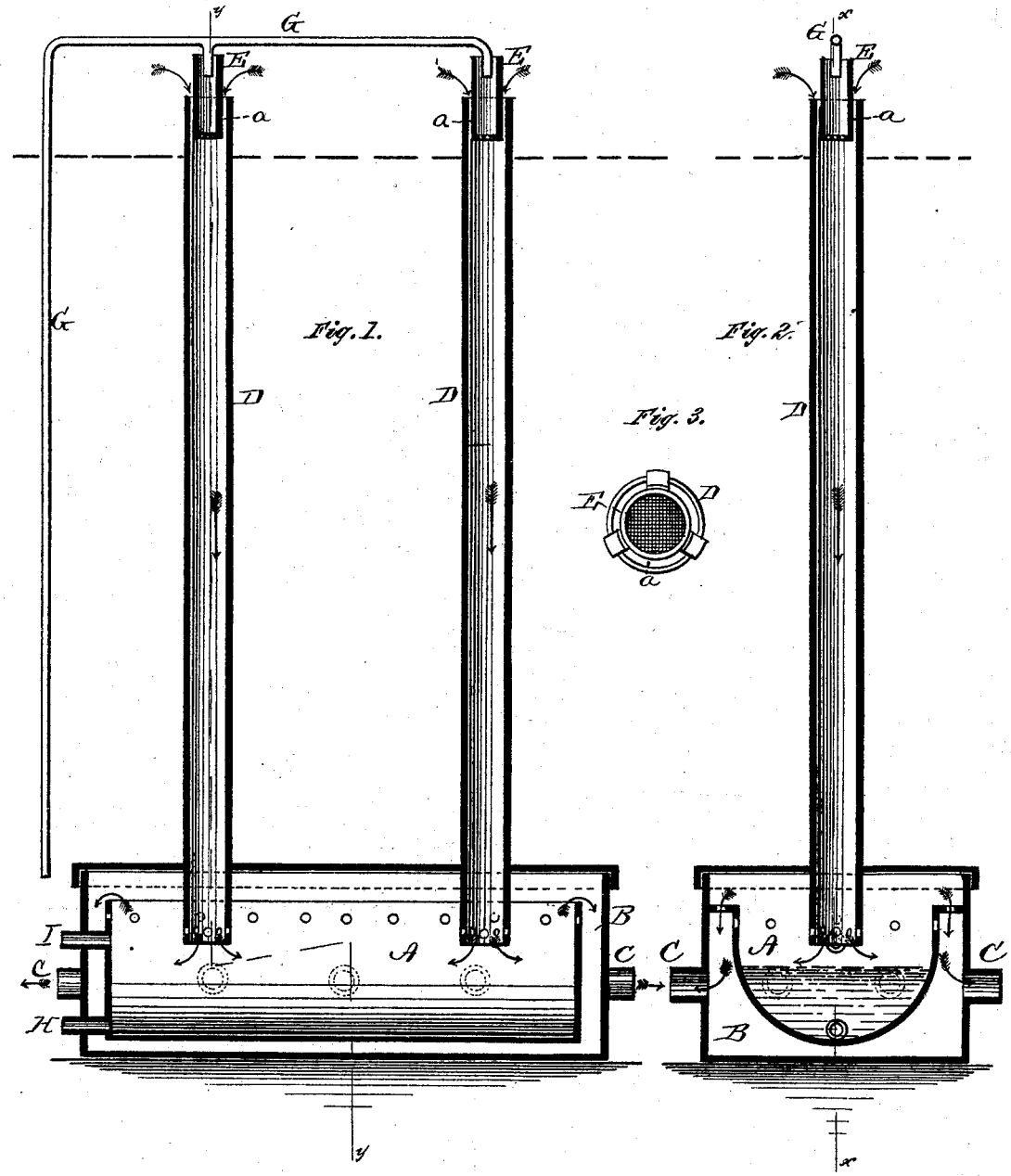

SAMUEL WHITMAN, OF BROOKLYN, NEW YORK.

IMPROVEMENT IN COOLING AND VENTILATING BUILDINGS.

Specification forming part of Letters Patent No. 150,920, dated May 12, 1874; application filed April 15, 1874.

*To all whom it may concern:*

Be it known that I, SAMUEL WHITMAN, of the city of Brooklyn, in the county of Kings and State of New York, have invented certain new and useful Improvements in Devices for Cooling and Ventilating Buildings; and I do hereby declare that the following is a full, clear, and exact description thereof, reference being had to the accompanying drawings, and to the letters of reference marked thereon, which form part of this specification.

The nature of my invention consists in the construction and arrangement of a device for cooling and ventilating buildings, as will be hereinafter more fully set forth.

In the accompanying drawing, Figure 1 is a longitudinal section, and Fig. 2 a transverse section, of my device. Fig. 3 is a bottom view of a water-receiver used in my invention.

My invention is based upon the known fact that falling water will always carry a quantity of air with it, and also make both itself and the air cooler by so falling.

A represents a water-reservoir, arranged in the lower part of the building, and surrounded by an air-chamber, B, which air-chamber is provided with air-outlets C C. D D are pipes for the passage of air and water, which pipes run vertically from above the top of the roof of the building downward to the top of the water-reservoir B. In the top of each pipe D is inserted a water-receiver, E. G is a water-pipe leading to the receivers E from a pump, and this pump is also, by a suction-pipe, H, connected with the water-reservoir A. I is an overflow-pipe from the reservoir A.

Water is raised, by means of a pump, engine, or otherwise, to the top of the building, and flows into the receivers E, which are provided with perforated bottoms, and inserted in the upper ends of the pipes D, with an air-space, $a$, between them. The water falling down this pipe will naturally draw air through the space $a$, and carry it down to the reservoir A, where the air will separate from the water, and find its way into the air-chamber B, and be conveyed through the outlets C to any part of the building where it may be required.

Another known law also helps this invention, which is, that cold air will always find its way to rarefied or hot air; therefore, as the room or building becomes heated, the cool air from the air-chamber will be drawn to any outlet leading into the heated parts of the building, and thus keep a constantly regular temperature.

The supply of water can be had from the street-main or elsewhere, and can be pumped back over and over again, thus making the actual consumption of water small.

The great advantage of this means of ventilation is, that the air thus drawn into the building is perfectly pure and cool, as the falling water naturally purifies it, and the temperature can be regulated by the quantity and fall of the water, and also by a register in the room, such as are used for heaters. There will thus be no strong objectionable drafts, as it will be completely diffused.

The same pipes used in the winter for heating can be used in the summer for cooling.

Having thus fully described my invention, what I claim as new, and desire to secure by Letters Patent, is—

The combination of the water-receivers E, vertical pipes D, water-reservoir A, and air-chamber B, with outlets C, substantially as and for the purposes herein set forth.

In testimony that I claim the foregoing as my own I affix my signature in presence of two witnesses.

S. WHITMAN.

Witnesses:
C. R. HENRY,
A. H. HENRY.